H. J. DOUGHTY.
TIRE.
APPLICATION FILED OCT. 3, 1916.

1,249,727.

Patented Dec. 11, 1917.

Inventor:
Henry J. Doughty,
by Emery, Booth, Janney & Varney
Attys.

UNITED STATES PATENT OFFICE.

HENRY J. DOUGHTY, OF PROVIDENCE, RHODE ISLAND, ASSIGNOR TO DOUGHTY TIRE COMPANY, OF PORTLAND, MAINE, A CORPORATION OF MAINE.

TIRE.

1,249,727.  Specification of Letters Patent.  Patented Dec. 11, 1917.

Application filed October 3, 1916. Serial No. 123,579.

*To all whom it may concern:*

Be it known that I, HENRY J. DOUGHTY, a citizen of the United States, and resident of Providence, in the county of Providence and State of Rhode Island, have invented an Improvement in Tires, of which the following description, in connection with the accompanying drawings, is a specification, like characters on the drawings representing like parts.

This invention relates to tires and the purpose is to provide a tire or tire-shoe of the pneumatic type which will be more durable than those hitherto known.

Figure 1:
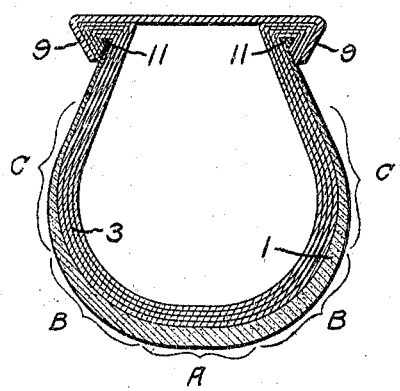
Figure 2:
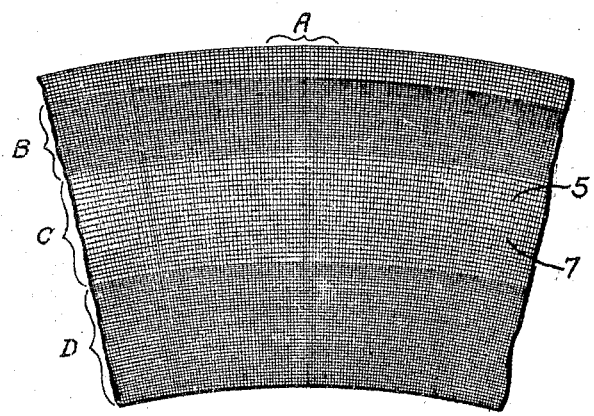

My invention will be best understood by reference to the accompanying drawings showing one illustrative embodiment thereof and wherein:

Figure 1 is a cross-section of a tire-shoe in contact with the ground;

Fig. 2 is a side elevation of a portion of the layers of fabric used in the shoe developed in a plane. In other words, no attempt has been made in this figure to show the transverse curvature of the tire. The showing of the threads of the fabric is somewhat diagrammatic.

Figure 3:
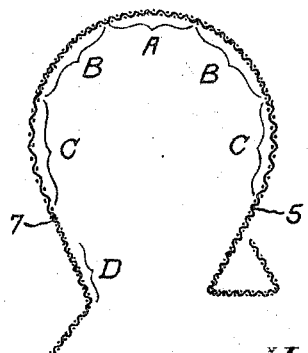

Fig. 3 is a cross-section, likewise diagrammatic, of one of the layers of the fabric.

I have herein shown my invention as applied to a tire-shoe of ordinary type divided along its inner side to permit the insertion of a pneumatic tube. Such shoes are usually constructed with an outer tread 1 of rubber and a carcass or body 3 of several layers of frictioned fabric, fabric being one form of fibrous reinforcement for the tire. In the embodiment of the invention chosen for illustrative purposes the layers of fabric are woven from longitudinal warp threads 5 and transverse weft threads. 7. The length of the warp threads 5 is so varied that the fabric takes the form of the tire as indicated in Figs. 2 and 3, that is, it has both a circumferential and transverse curvature corresponding thereto. If desired, the fabric may be woven of such a length that it may be wound circumferentially round and round upon itself to provide the desired number of layers to complete the carcass 3. This form of tire fabric is in itself well known and while I prefer to use it my invention is not in its broader aspects limited thereto.

The outer bearing surface of tires is frequently varied by surface ornamentation but their essential shape and the shape of the carcass more or less closely resembles that shown in Fig. 1 and embodies an outer curved part merging into side or flank portions which extend to the rim on which the tire is mounted and terminate in beads 9 for engaging the rim flanges.

When the tire is in use the central part of the curved outer surface, herein designated by the letter A, is somewhat flattened and is in contact with the ground. At either side of the region A there are two zones B curving upwardly from the bearing tread A which might be called the shoulders of the tire and these shoulders merge into the sides of flanks C. I have discovered that the shoulder zones B are the zones of greatest stress and that the bending of the tire in action is localized in these zones, rapidly weakening the same and destroying the tire. In accordance with my invention I so construct the tire that it will have a maximum resistance to flexure along these zones and a minimum resistance at the flank portion C whereby the bending action will be distributed to some extent from the zones B to the zones C and deleterious localization prevented. The greater resistance to flexure of the parts B is preferably obtained by constructing these parts from material having greater resistance than the material of flank portions and in particular in the case of a tire with a fibrous reinforcement, by increasing the density of distribution thereof along the zones B and decreasing it in the zones C.

In the present embodiment of the invention this variation of distribution is obtained by varying the closeness of weave of the fabric and in particular by varying the number of circumferential threads or warps therein. Referring particularly to Figs. 2 and 3, the tread zone A of the fabric is made with a fairly open weave and in the shoulder zones B at either side thereof a greater number of warp threads 5 are introduced so that the weave is much closer and so that the tire will be stiffer at that point. In the flank portions C the number of warp threads is preferably markedly reduced so that the weave is of a very open nature and but little stiffness is given to these portions but merely the necessary tensile strength. In the present embodiment of the invention the fabric is finished with a selvage portion D of suitable density of weave and adapted to be folded up about the bead forming rings 11 in the manner indicated in Fig. 3.

It will be apparent that because of the greater density of fibrous reinforcement at the shoulders B of the tire that they will not so readily flex and that some of the wear that is usually concentrated in these zones will be transmitted to the flank portions C of the tire which ordinarily receive a nearly straight thrust under load and that these because of their flexible nature due to the loose weave of the fabric as described will readily yield to the bending strain transmitted from the shoulder portions B. By this means the wear on the tire is distributed instead of localized and the durability therefore increased.

While I have described in considerable detail the embodiment of my invention shown in the accompanying drawings, it will be understood that I have done so in order that the structure illustrated may be more readily apprehended and not because my invention is limited to the detailed construction described.

What I do claim and desire to secure by Letters Patent is:

1. A tire having shoulder portions adjacent the tread or bearing part and flank portions between said shoulder portions and the junction of the tire with the rim, the material at the shoulder portions having greater resistance to flexure than that of the tread and the flank portions, the latter having minimum resistance.

2. A tire-shoe having a carcass comprising one or more layers of fabric woven to tire shape and including circumferential and transverse threads, the circumferential threads being closely set in zones at either side of the bearing tread and comparatively widely spaced at the tread and at zones between said first zones and the rim.

3. A tire having carcass fabric therein most closely woven in zones laterally contiguous to the tread, the tread being less closely woven than said zones and of open weave at the sides inwardly of those zones.

4. A tire having a fabric carcass constructed to offer a maximum resistance to flexure along zones at either side of the bearing tread and a minimum resistance at the sides whereby deleterious localization of bending action is prevented, the resistance offered at the tread being less than at the said zones.

5. A tire of rubber reinforced by fibrous material incorporated therewith, the density of distribution of the fibrous reinforcement being greater at the lateral portions of the outer curved part of the tire than at the center and least at the flanks of the tire between said curved part and the rim.

6. A woven tire-carcass fabric comprising a body portion including warps of lengths gradually decreasing from the center whereby the fabric is shaped to tire form and selvage portions adapted to form beads, said body portion including a central and lateral zones and side parts, the warp density being greatest in said lateral zones and less in said central zone and in said side parts.

7. A tire reinforced by one or more layers of fabric each of which is of closer weave along the lateral shoulder zones of the outer curved part thereof lying at either side of the central bearing tread than elsewhere.

8. A woven tire-carcass fabric comprising a body portion including warps of lengths gradually decreasing from the center whereby the fabric is shaped to tire form, the density of warp distribution being greater in those parts of the fabric corresponding to the lateral shoulder zones of the outer curved part of the tire at either side of the central bearing tread than elsewhere.

In testimony whereof, I have signed my name to this specification.

HENRY J. DOUGHTY.